United States Patent [19]
Girotti et al.

[11] 3,957,898
[45] May 18, 1976

[54] SYNTHETIC LUBRICATING OILS FROM THERMAL CRACKING OR POLYMERS HAVING VERY HIGH VISCOSITY

[75] Inventors: Pierleone Girotti; Renato Tesei; Telemaco Floris, all of San Donato Milanese, Italy

[73] Assignee: Snam Progetti S.p.A., San Donato Milanese, Italy

[22] Filed: Mar. 12, 1974

[21] Appl. No.: 450,471

[30] Foreign Application Priority Data
Mar. 12, 1973 Italy................................ 21457/73

[52] U.S. Cl............................. 260/676 R; 252/59; 260/96 D; 260/683.15 D; 260/683.9
[51] Int. Cl.$^2$...................... C07C 5/04; C10M 3/12
[58] Field of Search......... 252/59; 260/96 D, 683 R, 260/683.15 D, 683.9, 676, 677

[56] References Cited
UNITED STATES PATENTS

| | | | |
|---|---|---|---|
| 2,239,501 | 4/1941 | Frolich et al. | 252/59 |
| 3,149,178 | 9/1964 | Hamilton et al. | 252/59 X |
| 3,676,521 | 9/1969 | Stearns et al. | 260/683.1 |
| 3,682,823 | 8/1972 | Smith et al. | 260/683.9 X |
| 3,798,284 | 3/1974 | Tesei et al. | 260/683.15 D |
| 3,845,157 | 10/1974 | Woo | 260/683 R |
| 3,849,510 | 11/1974 | Maspero et al. | 260/680 R |

OTHER PUBLICATIONS
"Industrial Engineering Chemistry, Product Research and Development," Vol. 8, No. 3, Sept. 1969, pp. (299–303) Gates et al.

Primary Examiner—Herbert Levine
Attorney, Agent, or Firm—Ralph M. Watson

[57] ABSTRACT

Synthetic lubricating oil having a high viscosity index, very low pour point, low viscosity at 0°F, high thermal stability, high resistance to depolymerization, high flash point and very low carbon residue, is prepared by subjecting polymeric material of very high viscosity boiling above 175°C, and obtained through polymerization of normal alpha-olefines having the general formula R-CH = CH$_2$, wherein R is an alkyl radical containing from 2 to 16 carbon atoms, in the presence of a TiCl$_4$/polyiminoalane catalyst, in a substantially inert atmosphere which may contain hydrogen up to a manometer pressure of 1 kg/cm$^2$, to thermal cracking at atmospheric pressure and in the temperature range of 300°C to 420°C at a contact time in the range of 5 minutes to 4 hours, and then distilling product so obtained under vacuum to a temperature which corresponds to a distillation temperature of 400°C at atmospheric pressure, and finally subjecting the residue with a boiling point higher than 400°C to catalytic hydrogenation.

3 Claims, No Drawings

SYNTHETIC LUBRICATING OILS FROM THERMAL CRACKING OR POLYMERS HAVING VERY HIGH VISCOSITY

The present invention relates to a process for the preparation of synthetic lubricants. More particularly, through the process which is the subject of this application, very high viscosity index oils are obtained having very low pour points, low viscosity at 0°F, considerable resistence to depolymerization, high thermal stability, very low carbon residue, high flash points.

The process of the present invention consists of two successive phases.

The first phase has been described in a copending patent application Ser. No. 450,474, filed by us on Mar. 12, 1974 and relates to the preparation of polymers having a very high molecular weight and the wide range of viscosity between 250 cSt up to 15.000 cSt at 210°F. Said polymers are obtained with high yields through the polymerization of alpha-olefine mixtures from wax cracking or from single alpha-olefines having the general formula $R-CH=CH_2$ wherein R is an alkyl radical containing from 2 to 16 carbon atoms, in the presence or a catalyst formed by the complex $TiCL_4$/PIA (tetrachloride of Titanium/polyiminoalane) by operating in an inert atmosphere or at least partially substituted with hydrogen at a pressure of hydrogen at the manometer not higher than 1 kg/cm² and by distilling then the product of the polymerization up to a head temperature of 175°C.

The second phase of the process which is the subject of the present invention, through which the synthetic lubricating oils are obtained, consists in subjecting the polymers of very high viscosity with boiling point higher than 175°C, obtained in the first phase, to a thermal cracking at an atmospheric pressure, for the purpose of reducing the molecular weight of the polymers and of obtaining oils whose viscosity is appropriate for lubricants.

With treatment through thermal cracking of the very high viscosity polymers, lubricating oils are obtained which may present all the desired viscosity, from 4 cSt up to 20 – 30 – 50 cSt at 210°F and which present excellent characteristics and whose thermal viscosity is considerably improved.

The above is achieved through the change of the operating conditions such as the temperature and the contact time.

The useful temperatures range from 300° up to 420°C. The times of contact may range from 5 minutes up to 4 hours.

The thermal treatment is carried out by letting the high viscosity polymer obtained in the first phase flow at the desired speed through a coil maintained at the chosen temperature. The product coming from such a treatment is fractioned at a reduced pressure up to temperature which corresponds to a distillation temperature at 400°C at the atmospheric pressure, hereinafter referred to as "head temperature". The residue with a boiling point higher than 400°C constitutes the lubricating oil, the yield of which is calculated in percent by weight with respect to the polymer with boiling point higher than 175°C which is used as feed.

According to the viscosity of the feed polymers, in the considered range from 305 cSt to 5330 cSt at 210°F, the yields of the thermal treatment range respectively from 79% to the 71% by weight if oils having a viscosity at 210°F of about 20 cSt are needed and from 85% to 80% if by weight a viscosity at 210°F of 30 cSt is needed.

The oil having a boiling point higher than 400°C, obtained through the practice of the present invention is subsequently subjected to hydrogenation to eliminate the unsaturation therein present, which is about 1 double bond for molecule.

The hydrogenation can be carried out according to the conventional methods well known to those skilled in the art. In this case it was effected in the presence of a catalyst containing 0.3% of Pd on alumina, at the temperature of 200°C, at the starting hydrogen pressure of 100 kg/cm², for a total time of 5 hours in an autoclave.

The hydrogenated product having a boiling point higher than 400°C provides a synthetic lubricating oil of high quality.

A hydrogenated oil, representative of the present invention, having a viscosity of 20 cSt at 210°F, presents a viscosity index of 128, if calculated with the ASTM D2270/A method, and 149 if calculated with the ASTM D 2270/B method, pour point of −50°C, considerable depolymerization resistance, high thermal stability, very low carbon residue, flash point of 250°C.

The present invention is illustrated by the following examples, which are not limitative of the invention itself.

In said examples the kinematic viscosities were determined according to the ASTM D 445 method. As to the viscosity index, two values were reported one calculated according to the ASTM D 2270/A method and the second one according to the ASTM D 2270/B method, more correct for viscosity indices higher than 100. The pour point was determined according to the ASTM D 97 method. The iodine number according to the IP 84 method.

EXAMPLE 1

A polymer having a boiling point higher than 175°C obtained through polymerization of $C_8$-$C_{10}$ alpha-olefines from wax cracking and having a viscosity at 210°F of 305 cSt was subjected to a treatment at high temperature to reduce its viscosity and to obtain lubricating oils.

The treatment was carried out by causing said polymer to flow at a controlled speed through a steel coil placed in a bath of salts melted at the desired temperature. The diameter the coil was of 12 mm. and the length of the bathed part was of two meters. The tests were effected at atmospheric pressure.

The products coming from the different treatments at different temperature and at different contact times were distilled at a reduced pressure up to the head temperature, at atmospheric pressure, of 400°C.

The residue having a boiling point higher than 400°C was the synthetic lubricating oil.

The obtained results are shown in table I.

TABLE I

OIL WITH A BOILING POINT HIGHER THAN 400°

| Test | Contact time | Temperature °C | Yield % b.w. | cSt 210°F | cSt 100°F | I.V. | Pour point °C | Iodine number |
|---|---|---|---|---|---|---|---|---|
| 1 | 2 hours | 350 | 89 | 45.3 | 416 | 128–174 | | |
| 2 | " | 360 | 83 | 26.5 | 222 | 130–162 | | |
| 3 | " | 370 | 76 | 16.1 | 119 | 132–155 | | 29 |
| 4 | 1 hour | 360 | 87 | 38.4 | 343 | 128–171 | | 25 |
| 5 | " | 370 | 82 | 23.6 | 189 | 131–163 | | |
| 6 | " | 380 | 74 | 14.8 | 107 | 132–153 | −52 | |
| 7 | ½ hour | 370 | 87 | 36.2 | 316 | 129–171 | | |
| 8 | " | 380 | 82 | 23.7 | 189 | 131–163 | | |
| 9 | " | 390 | 74 | 16.9 | 126 | 132–156 | −52 | |
| 10 | ¼ hour | 380 | 89 | 38.4 | 339 | 129–172 | | |
| 11 | " | 390 | 82 | 25.8 | 211 | 130–164 | | |
| 12 | " | 400 | 76 | 17.6 | 131 | 132–158 | −50 | 30 |

From such results it was deduced that by changing the temperature and the time of contact, oils at the desired viscisity could be obtained having viscosity indices and pour points very low. The yields of oil with a boiling point higher than 400°C with respect to the feed polymer were high and, being equal the viscosities, maintained about constant. For instance, from the graph yield-viscosity it was deduced that oils having the same viscosity of 20 cSt at 210°F were obtained, at the different conditions, with a yield of about the 78–79% b.w.

EXAMPLE 2

The thermal treatment was effected by using as feed a polymer with boiling point higher than 175°C, obtained through polymerization of the $C_8$ to $C_{10}$ from wax cracking and having a viscosity at 210°F of 660 cSt.

The apparatus was the same as that of example 1. The obtained results are reported in table II.

TABLE II

OIL WITH A BOILING POINT HIGHER THAN 400°

| Test | Contact time | Temperature °C | Yield % b.w. | cSt 210°F | cSt 100°F | I.V. | Pour point °C | Iodine number |
|---|---|---|---|---|---|---|---|---|
| 1 | 2 hours | 350 | 87 | 49.7 | 460 | 128–178 | | |
| 2 | " | 360 | 84 | 29.6 | 256 | 129–163 | | |
| 3 | " | 370 | 75 | 18.8 | 150 | 129–151 | | |
| 4 | " | 380 | 57 | 10.1 | 68.4 | 130–143 | | |
| 5 | 1 hour | 350 | 92 | 69.4 | 678 | 126–186 | | |
| 6 | " | 360 | 88 | 42.1 | 384 | 128–172 | | |
| 7 | " | 370 | 81 | 25.1 | 209 | 130–160 | | |
| 8 | " | 380 | 73 | 15.8 | 118 | 131–152 | −50 | 29 |
| 9 | " | 390 | 55 | 8.76 | 56.4 | 131–143 | | |
| 10 | ½ hour | 360 | 91 | 59.5 | 579 | 126–180 | | |
| 11 | " | 370 | 87 | 35.4 | 314 | 129–168 | | |
| 12 | " | 380 | 81 | 25.8 | 214 | 130–162 | | |
| 13 | " | 390 | 71 | 15.9 | 120 | 130–151 | −51 | 30 |
| 14 | " | 400 | 63 | 11.5 | 79 | 132–148 | | |
| 15 | ¼ hour | 380 | 87 | 44.3 | 403 | 128–175 | | |
| 16 | " | 390 | 83 | 27.8 | 226 | 131–169 | | |
| 17 | " | 400 | 77 | 18.6 | 144 | 130–155 | −59 | 29 |
| 18 | " | 410 | 72 | 14.0 | 122 | 131–123 | | |

As will be noted from table II the oils having a boiling point higher than 400°C, obtained from the polymer having 660 cSt at 210°F, had high V.I. and very low pour points. The yields were high and, being equal the viscosity, were about steady: for instance from the graph yield — Viscosity it was deduced that oils with a viscosity of 20 cSt at 210°F were obtained at the different conditions with a yield of about the 76 – 78% b.w.

EXAMPLE 3

The thermal treatment was effected by using as feed a polymer with a boiling point higher than 175°C obtained through polymerization of the $C_8$ - $C_{10}$ alpha-olefines from wax cracking and having viscosity at 210°F of 1160 cST.

The apparatus was equal to the one of table III.
The obtained results are reported in table III.

TABLE III

OIL WITH A BOILING POINT HIGHER THAN 400°C

| Test | Contact time | Temperature °C | Yield % b.w. | cSt 210°F | cSt 100°F | I.V. | Pour point °C | Iodine number |
|---|---|---|---|---|---|---|---|---|
| 1 | 2 hours | 360 | 86 | 39.5 | 344 | 129–175 | | |
| 2 | " | 370 | 77 | 21.7 | 174 | 130–158 | | |
| 3 | " | 380 | 64 | 11.6 | 79 | 132–150 | | |
| 4 | 1 hour | 360 | 90 | 60.3 | 341 | 125–166 | | |

TABLE III-continued

| | | | | OIL WITH A BOILING POINT HIGHER THAN 400°C | | | | |
|---|---|---|---|---|---|---|---|---|
| Test | Contact time | Temperature °C | Yield % b.w. | cSt 210°F | cSt 100°F | I.V. | Pour point °C | Iodine number |
| 5 | '' | 370 | 84 | 36.5 | 362 | 125–155 | | |
| 6 | '' | 380 | 74 | 19.2 | 154 | 129–154 | −52 | 30 |
| 7 | '' | 390 | 59 | 11.3 | 77 | 132–149 | | |
| 8 | ½ hour | 380 | 84 | 33.5 | 290 | 129–169 | | |
| 9 | '' | 390 | 76 | 20.6 | 157 | 132–163 | −50 | 31 |
| 10 | '' | 400 | 64 | 12.2 | 83 | 133–153 | | |
| 11 | ¼ hour | 380 | 89 | 59.1 | 570 | 127–180 | | |
| 12 | '' | 390 | 84 | 34.2 | 293 | 129–171 | | |
| 13 | '' | 400 | 77 | 21.4 | 169 | 131–160 | −50 | 30 |
| 14 | '' | 410 | 70 | 14.5 | 104 | 132–154 | | |

From said results it will be noticed that by employing a polymer having a viscosity of 1160 cSt at 210°F oils at the desired viscosity could be obtained, having high viscosity indices and very low pour points. The yields with boiling points higher than 400°C were high and, being equal the viscosity, maintained almost steady: for instance from the graph yield-viscosity it was deduced that oils having the same viscosity of 20 cSt at 210°F were obtained with yields of 75 – 76% b.w. These values were slightly lower than the ones obtained in the preceding examples wherein polymers having lower viscosity were employed.

EXAMPLE 4

The thermal treatment was carried out by using as feed a polymer with a boiling point higher than 175°C, obtained through polymerization of the $C_8$ - $C_{10}$ alpha-olefines from wax cracking and having a viscosity at 210°F of 5330 cSt.

The apparatus was the same as that of example I.
The obtained results was reported in table IV.

preceding examples wherein polymers having lower viscosity were used. By comparing all the treatments carried out on polymers having viscosities at 210°F from 305 cSt up to 5330 cSt it was noticed that with the process of the invention, adjusting the operating conditions, it was always possible to obtain oils having the desired viscosity.

If the operation started from a more viscous polymer it was necessary to operate at higher temperatures or at longer contact times and consequently the oil yield was lower. For instance oils having a viscosity of 20 cSt at 210°F were obtained with yields of 78 – 79% if the feed polymer had a viscosity of 305 cSt at 210°F and with yields of 71 – 72% if the feed polymer had a viscosity of 5330 cSt at 210°F. Intermediate oil yields were obtained from feed polymers having intermediate viscosities between the above values.

The viscosities indices of the obtained oils were in any case high, while the pour points were very low.

The obtained oils were not saturated as is shown with the value of their iodine number. They therefore must

TABLE IV

| | | | | OIL WITH A BOILING POINT HIGHER THAN 400°C | | | | |
|---|---|---|---|---|---|---|---|---|
| Test | Contact time | Temperature °C | Yield % b.w. | cSt 210°F | cSt 100°F | I.V. | Pour point °C | Iodine number |
| 1 | 2 hours | 360 | 84 | 48.2 | 463 | 127–172 | | |
| 2 | '' | 380 | 62 | 12.6 | 90 | 130–147 | | |
| 3 | '' | 400 | 38 | 2.97 | 11.27 | 134–132 | | |
| 4 | 1 hour | 360 | 90 | 84.9 | 889 | 125–187 | | |
| 5 | '' | 370 | 86 | 47.2 | 442 | 128–174 | | |
| 6 | '' | 380 | 75 | 24.9 | 211 | 129–157 | −50 | 32 |
| 7 | '' | 390 | 63 | 13.0 | 93 | 130–148 | | |
| 8 | ½ hour | 370 | 89 | 74.8 | 788 | 125–181 | | |
| 9 | '' | 380 | 83 | 39.4 | 357 | 128–170 | | |
| 10 | '' | 390 | 74 | 23.4 | 192 | 130–159 | | |
| 11 | '' | 400 | 61 | 14.1 | 101 | 132–152 | | |
| 12 | ¼ hour | 380 | 89 | 72.2 | 676 | 127–193 | | |
| 13 | '' | 390 | 82 | 42.5 | 385 | 128–173 | | |
| 14 | '' | 400 | 74 | 23.6 | 197 | 129–155 | −49 | 33 |
| 15 | '' | 410 | 65 | 14.9 | 109 | 131–152 | | |

From the results above reported it was deduced that also using as feed a polymer with a viscosity of 5330 cSt at 210°F, oils at the desired viscosity could be obtained, having high viscosity indices and pour points very low. The oil yields with boiling point higher than 400°C were high and, being equal the viscosity, maintained almost steady.

From the graph yield-viscosity it was deduced that oils having the same viscosity of 20 cSt at 210°F were obtained with yields of about the 71 – 72%, values which were slightly lower than the ones obtained in the be hydrogenated.

EXAMPLE 5

The synthetic oil with a boiling point higher than 400°C obtained in test 6 of example 3 (see table III) was hydrogenated to completely saturate the double olefinic bonds.

The operation was carried out in an autoclave in the presence of 5% by weight of a catalyst containing 0.3% of Pd on alumina at the temperature of 200°C, under a hydrogen pressure of 100 kg/cm$^2$, for a total time of 5 hours.

The characteristics of the oil before and after the hydrogenation are reported in table V.

TABLE V

Characteristics of the oil of the test 6 of the examples before and after the hydrogenation

|  | Method | Not hydrogenated oil | Hydrogenated oil |
|---|---|---|---|
| Specific gravity at 20°C | ASTM D 1481 | 0.843 | 0.842 |
| Kinetic viscosity at 210°F, cSt | ASTM D 445 | 19.2 | 20.1 |
| Kinetic Viscosity at 100°F, cSt | ASTM D 445 | 154 | 167 |
| Viscosity index | ASTM D 2270/A | 129 | 128 |
|  | ASTM D 2270/B | 154 | 149 |
| Absolute viscosity at 0°F (−18°C−, cP | ASTM D 2602 | 5800 | 5900 |
| Pour point, °C | ASTM D 97 | −52 | −50 |
| Ramsbottom pour point % b.w. | ASTM D 524 | — | 0.006 |
| Flash point, °C | ASTM D92 | — | 250 |
| Molecular weight | osmom. | — | 690 |
| Iodine number. g/100 g | IP 84 | 30 | 2 |

From those results it was noted that the hydrogenation did not substantially modify the characteristics of the oil which remained very good.

From the value of the viscosities at 210° and at 0°F, and from the pour point could be deduced that the oil presented a good behaviour both at high temperature and at low temperatures.

Furthermore the very low value of the carbon residue and the high flash point are to be noted.

EXAMPLE 6

The hydrogenated oil of example 5 was subjected to the stability test and to the stability to the Raytheon shearing with the sonic oscillator for a time of 15 minutes, at the temperature of 100°F (ASTM D 2603-70). The results are reported in table VI.

TABLE VI

|  | Hydrogenated oil of ex. 5 | |
|---|---|---|
|  | As such | After the test |
| kinematic viscosity at 210°F. cSt | 20.1 | 20.0 |
| Kinematic viscosity at 100°F, cSt | 167 | 166 |

From the examination of said results it was possible to deduce that the hydrogenated oil which was obtained with the process of the invention was resistant to the sonic depolymerization test.

EXAMPLE 7

The hydrogenated oil of example 5 was subjected to thermal stability testing according to the Federal Std. Method, n° 2508 "Thermal Stability of Lubricating and Hydraulic Fluids," which consists in maintaining at the temperature of 260°C, for 24 hours, 20 cc of the oil under examination in a glass tube which was sealed with the flame, the oil being previously degassed.

TABLE VIII

|  | Hydrogenated oil of ex. 5 | |
|---|---|---|
|  | As such | After test |
| Kinematic viscosity at 210°F, cSt | 20.1 | 20.0 |
| Kinematic viscosity at 100°F, cSt | 167 | 166 |

On the basis of said results it was possible to affirm that the hydrogenated oil which was obtained with the process of the invention was thermally stable.

What we claim is:

1. Process for the preparation of synthetic lubricating oil having a high viscosity index, very low pour point, low viscosity at 0°F, high thermal stability, high resistance to depolymerization, high flash point and very low carbon residue, which consists of subjecting polymeric material of very high viscosity and boiling above 175°C, obtained through polymerization of normal alpha-olefines having the general formula $R-CH=CH_2$ wherein R is an alkyl radical containing from 2 to 16 carbon atoms, in the presence of the catalyst $TiCL_4$/polyiminoalane, in a substantially inert atmosphere containing not more than the quantity of hydrogen which has a manometer pressure of 1 kg/cm², to thermal cracking at atmospheric pressure in the temperature range of 300°C to 420°C for a contact time in the range of 5 minutes to 4 hours, distilling the product so obtained under vacuum to a temperature which corresponds to a distillation temperature of 400°C at atmospheric pressure, and then subjecting the residue with a boiling point higher than 400°C to catalytic hydrogenation.

2. Hydrogenated synthetic lubricating oils having a boiling point higher than 400°C, when obtained through the process of claim 1.

3. Hydrogenated synthetic lubricating oil constituted by a plurality of products obtained through the process of claim 1.

* * * * *

UNITED STATES PATENT AND TRADEMARK OFFICE
CERTIFICATE OF CORRECTION

PATENT NO. : 3,957,898
DATED : May 18, 1976
INVENTOR(S) : Pierleone Girotti, et al It is certified that error appears in the above—identified patent and that said Letters Patent are hereby corrected as shown below:

Col. 1, line 27, correct "$TiCL_4$/PIA" to read -- $TiCl_4$/PIA --.

Col. 2, line 7, correct "if by weight" to read

-- by weight if --.

Col. 3, line 56, after "$C_8$ to $C_{10}$" insert -- olefines --.

Col. 7, line 21, correct "210°" to read -- 210°F --.

Col. 8, line 40, correct "$TiCL_4$" to read -- $TiCl_4$ --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*